3,534,083
SUBSTITUTED-C-NOR-ANDROSTANES
Paul Kurath, Waukegan, Ill., assignor to Abbott Laboratories, North Chicago, Ill., a corporation of Illinois
No Drawing. Filed May 15, 1967, Ser. No. 638,592
Int. Cl. C07c 35/22, 69/02
U.S. Cl. 260—488          4 Claims

ABSTRACT OF THE DISCLOSURE 3,11,17 - substituted-C-nor-androstanes are made from 3α,11α,17β-trihydroxy - 13α - C - nor-5β-androstane-11β-carboxylic acid 11a,-17-lactone. The new C-nor-androstanes inhibit prostate growth and control benign prostatic hyperplasia.

SUMMARY OF INVENTION

The present invention is directed to 3,11,17-trisubstituted and 3,17-disubstituted C-nor-androstanes of the general formula

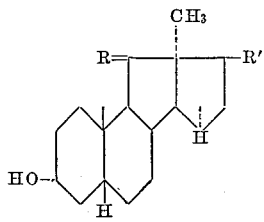

wherein R is oxygen, hydroxy or hydrogen and R′ is hydroxy or formyloxy and wherein R and R′ together may form a hemiacetal bridge of the partial structure

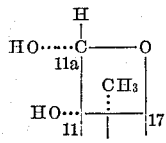

and lower fatty acid esters of the above hydroxy compounds. Where the compound of the above structure carries more than one hydroxy group, the corresponding polyesters can easily be prepared by standard esterification procedures; compounds with one or more esterified hydroxy groups and one or more free hydroxy groups are more difficult to prepare but are generally available by partial esterification of some of the free hydroxy groups or by esterification of all hydroxy groups followed by selective saponification.

DETAILED DESCRIPTION

The compound wherein R and R′ together form the hemiacetal bridge described above are made by reducing 3α,11α,17β-trihydroxy - 13α - C - nor - 5β - androstane-11β-carboxylic acid 11a,17-lactone (described in Experientia 22, 657 of 1966) with one or more molar equivalents of lithium aluminum hydride in an inert solvent, e.g. ether or tetrahydrofuran at a temperature of between 0° and the boiling point of the solvent. The hemiacetal ring can be opened by treatment with lead tetraacetate to yield 17β-formyloxy-3α-hydroxy-13α-C-nor-5β-androstan-11-one in which the 3α-hydroxy group can be acetylated or in which the formyloxy group can be converted to a hydroxy group by standing in a dilute alcoholic alkali carbonate solution. The 11-keto group can be converted to a hydroxy group in known fashion, e.g. by a metal hydride reduction or the keto group can be completely removed by the Wolff-Kishner procedure. In all instances, the free hydroxy groups may be converted into fatty acid esters by treating the hydroxy compound with a fatty acid anhydride or chloride in the presence of pyridine. The preferred fatty acid esters are the acetates.

The C-nor-compounds of the present invention are useful as antiandrogens with particular application to control the growth of the prostate in warm blooded male animals. A typical dosage for subcutaneous application is between 0.05 and 0.5 mg./kg. per day which is administered as a solution or suspension in a non-toxic vegetable oil.

For the purpose of illustration, the following typical and representative examples are given; they are not meant to limit the invention in any respect. All rotations are recorded in chloroform solutions at the concentrations indicated.

EXAMPLE I

3α,11α,17β-trihydroxy-(and triacetoxy)-13α-C-nor-5β androstane-11β-carboxaldehyde 11a,17-hemiacetal A solution of 0.960 g. of 3α,11α,17β-trihydroxy-13α-C-nor-5β-androstane-11β-carboxylic acid 11a,17-lactone in 200 ml. of anhydrous ether is added dropwise to a stirred suspension of 1.085 g. of lithium aluminum hydride in 150 ml. of anhydrous ether at room temperature. The mixture is stirred for 7 hours and subsequently allowed to stand overnight at room temperature. The solution is then gently refluxed for 10 minutes, cooled to room temperature, and diluted with 30 ml. of moist ether. To the dilute solution is added 5 ml. of water and 100 ml. of 2 N-sulfuric acid. The two layers formed are separated and the aqueous solution is extracted with two 250-ml. portions of ether. The ether extract is washed with water, saturated aqueous sodium bicarbonate solution and again with water, dried over anhydrous magnesium sulfate, filtered and evaporated to leave 1.060 g. of an oily residue which no longer shows the lactone carbonyl absorption in the infra-red. This crude product is chromatographed by placing it on a column containing 100 g. of silica gel. From the benzene-ethyl acetate (1:1) eluates, a total of 0.875 g. of an oily residue is obtained after evaporation of the solvent. The pure oil has a $[\alpha]_D^{25} -50°$ (c.=1.014) and the infra-red spectrum and the analytical values obtained confirm the compound to be 3α,11α,17β-trihydroxy-13α-C-nor-5β-androstane-11β-carboxaldehyde 11a,17-hemiacetal.

Treating the above compound with an excess of acetic anhydride in the presence of pyridine yields 3α,11α,11aα-triacetoxy - 17β - hydroxy-13α-C-nor-5β-androstane-11β-carboxaldehyde 11a,17-hemiacetal of empirical formula $C_{25}H_{36}O_7$.

EXAMPLE 2

17β-formyloxy-3α-hydroxy-(and 3α-acetoxy)-13α-C-nor-5β-androstan-11-one

A solution of 0.875 g. of 3α,11α,17β-trihydroxy-13α-C-nor-5β-androstane-11β-carboxaldehyde 11a,17-hemiacetal and 2.41 g. of lead tetraacetate in 120 ml. of glacial acetic acid is allowed to stand overnight at room temperature. The reaction mixture is then diluted with 5 ml. of ethylene glycol, allowed to stand for 5 minutes, and concentrated on the steam bath to a volume of about 20 ml. The mixture is taken up in 600 ml. of ether and 200 ml. of ice cold water, the layers are separated and the aqueous phase is first extracted with 600 ml. of ether and then with 300 ml. of ether. The organic extracts are washed with three 200-ml. portions of water, three 200-ml. portions of ice-cold saturated aqueous sodium bicarbonate solution, and again with water until neutral. The combined organic extracts are dried, filtered and evaporated to yield 0.835 g. of an oily residue which is placed on a chromatographic column containing 100 g. of silica gel. From the benzene-ethyl acetate (4:1) eluates, 0.739 g. of 17β-formyloxy-3α-hydroxy-13α-C-nor-5β-androstan-11-one is obtained which could not be induced to crystallize. The compound shows $[\alpha]_D^{24} -4°$ (c.=0.972) and the analytical values are in good agreement with those calculated for the desired compound of the empirical formula $C_{19}H_{28}O_4$.

Treatment of the above 3α-hydroxy compound with acetic anhydride in the presence of pyridine yields 3α-acetoxy-17β-formyloxy-13α-C-nor-5β-androstan-11 - one for which the analytical values show good agreement with those calculated from the empirical formula $C_{21}H_{30}O_5$. Replacing acetic anhyride with propionic anhydride yields the corresponding 3α-propionate of the empirical formula $C_{22}H_{32}O_5$.

Careful hydrolysis of the 3α-acetoxy-17β-formyloxy-13α-C-nor-5-β-androstan-11-one shown above in an aqueous methanolic sodium bicarbonate solution yields 3α-acetoxy-17β-hydroxy-13α-C-nor-5β-androstan-11-one the analytical values of which are in good agreement with those calculated from the empirical formula $C_{20}H_{30}O_4$.

EXAMPLE 3

3α,17β-dihydroxy-(and diacetoxy)-13α-C-nor-5β-androstan-11-one

A solution of 0.729 g. of 17β-formyloxy-3α-hydroxy-13α-C-nor-5β-androstan-11-one and 0.320 g. of potassium carbonate in 25 ml. of methanol and 3.5 ml. of water is allowed to stand for 5 days at room temperature. The solution is then diluted with 100 ml. of distilled water and methanol is removed under reduced pressure. The resulting crystalline suspension is cooled and the crystals collected on a filter. The crystals are washed several times with small amounts of water and dried to yield 0.466 g. of 3α,17β-dihydroxy-13α-C-nor-5β-androstan-11-one (first crop). The turbid aqueous filtrate is acidified by the addition of 2 N-hydrochloric acid and then extracted with ether. The ether extract is washed with water, dried, filtered and evaporated to leave 0.198 g. of a solid residue which is identical to the above first crop. The combined crystals are chromatographed on a column containing 70 g. of silica gel and eluted with benzene-ethyl acetate (1:1). The product so obtained is recrystallized twice from acetone-heptane to yield a total of 0.526 g. of 3α-,17β-dihydroxy-13α-C-nor-5β-androstan-11-one melting at 180–183°. An analytical sample of this compound melts at 185–185.5°, shows $[\alpha]_D^{25} +5°$ (c.=1.01), and the analytical values are in good agreement with those calculated for the empirical formula $C_{18}H_{28}O_3$.

A solution of 0.067 g. of the above prepared 3α,17β-dihydroxy-13α-C-nor-5β-androstan-11-one in 3 ml. of acetic anhydride and 3 ml. of pyridine is allowed to stand for two days at room temperature. The acetic anhydride and pyridine are removed by distillation under reduced pressure and the residue is dissolved in 50 ml. of ether. The ether solution is washed with three 10-ml. portions of 2 N hydrochloric acid, then with 10-ml. of water, three 10-ml. portions of saturated sodium bicarbonate solution, and finally with water until neutral. The ether extract is dried over anhydrous magnesium sulfate, filtered and evaporated to leave 0.066 g. of 3α,17β-diacetoxy-13α-C-nor-5β-androstan-11-one as an oil. This oil is crystallized and recrystallized from heptane to yield 0.035 g. of the pure compound melting at 121–122°, $[\alpha]_D^{25} +37°$ (c.=1.043). The analytical values obtained correspond to the empirical formula $C_{22}H_{32}O_5$. A second crop of 0.009 g., melting at 117–120°, is obtained from the concentrated mother liquors.

EXAMPLE 4

3α,11ξ,17β-trihydroxy-(or triacetoxy)-13α-C-nor 5β-androstane

To a solution of 3α,17β-dihydroxy-13α-C-nor-5β-androstan-11-one in methanol is added dropwise an aqueous solution of a slight molar excess of sodium borohydride at 20° C. The mixture is allowed to stand for 10 minutes after which time a solution of aqueous sodium hydroxide is added to destroy the excess sodium borohydride. The solution is then concentrated to about half the original volume and water is added to dilute the solution to at least its original volume. The reduced compound is extracted with several portions of ether and the combined extracts are dried and worked up in the usual fashion to yield 3α,11ξ,17β-trihydroxy-13α-C-nor-5β-androstane. The compound shows analytical values which are in good agreement with those calculated for the empirical formula $C_{18}H_{30}O_3$.

The hydroxy groups in the above compound are acetylated as shown in Example 4 with an excess of acetic anhydride in the presence of pyridine, producing 3α,11ξ,17β-triacetoxy-13α-C-nor-5β-androstane.

EXAMPLE 5

3α,17β-dihydroxy-(or diacetoxy)-13α-C-nor-5β-androstane

To a solution of 3α,17β-dihydroxy-13α-C-nor-5β-androstan-11-one in ethylene glycol is added an aqueous solution of hydrazine hydrate, the latter being used in excess over the theoretical amount required. An excess of sodium hydroxide is added and the mixture is heated in an oil bath to 175° C. for 30 minutes during which time most of the water evaporates. After cooling, the mixture is diluted with 10 volumes of water and the 3α,17β-dihydroxy-13α-C-nor-5β-androstane is extracted with ether. The ether extracts are worked up in the usual fashion and the crude material is recrystallized to yield a compound giving analytical values which are in good agreement with those calculated for the compound of empirical formula $C_{18}H_{30}O_2$.

The above diol is acetylated in the usual fashion by using an excess of acetic anhydride and pyridine to yield 3α,17β-diacetoxy-13α-C-nor-5β-androstane of the empirical formula $C_{22}H_{34}O_4$.

EXAMPLE 6

The compound prepared as described in the first paragraph of Example 3 is subcutaneously administered to a group of 5 male rats each weighing approximately 400 g. at a dose of 0.45 mg. per day per animal for 12 days. For each administration, the dose of the active compound is injected as a solution in 0.2 ml. of sesame oil. In a control group of 6 animals, the average weight of the dorsal lateral prostate is 295.7 mg. while in the group of the 5 treated rats the average weight of the dorsal lateral prostate is 277.6 mg. In the control group, the average weight of the levator ani is 296.3 mg. while the average weight of the levator ani in the treated animals is 266.8 mg. No significant differences are observed in the body weights, seminal vesicles or adrenal glands between the control animals and the tested animals.

I claim:
1. A compound of the formula

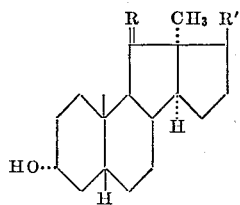

wherein R is hydroxy, oxygen or hydrogen and R' is hydroxy or formyloxy, and lower fatty acid esters thereof.

2. The compound of claim 1 wherein R and R' both are hydroxy.

3. The compound of claim 1 wherein R is oxygen and R' is hydroxy.

4. The diacetoxy ester of the compound of claim 1 wherein R is oxygen and R' is hydroxy.

References Cited
UNITED STATES PATENTS 3,325,536  6/1967  Holden.

BERNARD HELFIN, Primary Examiner

G. A. SCHWARTZ, Assistant Examiner

U.S. Cl. X.R.

260—346.2, 586, 617; 424—285, 311, 331, 343